United States Patent [19]

Shellhouse et al.

[11] Patent Number: 4,607,707
[45] Date of Patent: Aug. 26, 1986

[54] CHISEL PLOW LANDSIDE

[75] Inventors: Wayne L. Shellhouse, Rock Island; James M. VanAuwelaer, Coal Valley, both of Ill.

[73] Assignee: Deere & Company, Moline, Ill.

[21] Appl. No.: 625,810

[22] Filed: Jun. 28, 1984

[51] Int. Cl.[4] ............................................. A01B 15/00
[52] U.S. Cl. ..................................... 172/764; 172/251
[58] Field of Search ............... 172/764, 770, 771, 746, 172/754, 765, 738, 699, 700, 251

[56] References Cited

U.S. PATENT DOCUMENTS

| | | |
|---|---|---|
| D. 168,148 | 11/1952 | Demorest . |
| 422,896 | 3/1890 | Stewart ................................ 172/764 |
| 795,429 | 7/1905 | Culbertson . |
| 1,108,174 | 8/1914 | Hollingsworth ................. 172/764 X |
| 1,232,139 | 7/1917 | Westbrooks . |
| 1,299,435 | 4/1919 | Dorkins ............................ 172/764 X |
| 1,540,950 | 6/1925 | Rausler et al. . |
| 1,553,685 | 9/1925 | Gresham . |
| 1,669,025 | 5/1928 | Seaholm .............................. 172/754 |
| 1,752,070 | 3/1930 | Doersch . |
| 2,002,059 | 5/1935 | Gurley . |
| 2,350,049 | 5/1944 | Lee . |
| 2,390,447 | 12/1945 | Miller . |
| 2,396,132 | 2/1946 | Shaffer . |
| 2,689,514 | 9/1954 | Ferguson . |
| 2,748,684 | 5/1956 | Kirby . |
| 2,796,012 | 6/1957 | Botha ................................... 172/699 |
| 3,023,819 | 3/1962 | Tanke ............................. 172/764 X |
| 3,393,753 | 7/1968 | Perkins . |
| 3,603,405 | 9/1971 | Arnold . |
| 3,643,748 | 2/1972 | Mathews et al. ..................... 172/719 |
| 3,643,784 | 2/1972 | Matthews et al. . |
| 3,667,550 | 6/1972 | Lehman . |
| 3,762,483 | 10/1973 | Meiners . |
| 3,931,858 | 1/1976 | North . |
| 4,050,521 | 9/1977 | Rowan . |
| 4,057,112 | 11/1977 | Taylor . |
| 4,077,651 | 3/1978 | Steinbach et al. . |
| 4,102,402 | 7/1978 | Steinberg . |
| 4,187,916 | 2/1980 | Harden et al. . |
| 4,207,952 | 6/1980 | Van Natta . |
| 4,275,792 | 6/1981 | Jensen et al. . |
| 4,313,503 | 2/1982 | Good et al. . |

FOREIGN PATENT DOCUMENTS

| | | |
|---|---|---|
| 29175 | 7/1907 | Austria . |
| 75915 | 6/1953 | Denmark ........................... 172/738 |
| 132397 | 1/1985 | European Pat. Off. ............ 172/699 |
| 819595 | 7/1949 | Fed. Rep. of Germany . |
| 241756 | 4/1959 | Fed. Rep. of Germany . |
| 948308 | 6/1947 | France . |
| 1388883 | 12/1963 | France . |
| 967290 | 10/1983 | U.S.S.R. . |

Primary Examiner—Richard J. Johnson
Attorney, Agent, or Firm—Henderson & Sturm

[57] ABSTRACT

A chisel plow including a landside attached rearwardly of the chisel shovels. The landside is disposed to extend generally fore-and-aft and is disposed laterally outward to one of the lateral edges of the chisel shovel. As the chisel plow travels forwardly through the soil, each chisel shovel forms a fore-and-aft furrow defined by opposing furrow walls cut by the lateral edges of the chisel shovel. The landside bears against one of the furrow walls to counteract forces which tend toward an overcutting or undercutting condition. Structure is provided to allow the selective mounting of the landside to be disposed laterally outward to either of the lateral edges of the chisel shovel to control overcutting or undercutting. This results in improved functional performance of the entire chisel plow implement by allowing it to maintain its proper width of cut.

2 Claims, 8 Drawing Figures 4,607,707

1

CHISEL PLOW LANDSIDE

TECHNICAL FIELD

This invention relates to chisel plows, and more particularly to landsides used in conjunction with chisel plow shovels.

BACKGROUND ART

The trend to conservation practices in agriculture has lead to the increased utilization of conservation tillage tools such as chisel plows. Chisel plows typically include a frame which is disposed perpendicular to the direction of travel of the draft vehicle wherein an equal number of chisel shovels are attached to the frame on both sides of the hitch.

Attachments are currently available which allow the use of chisel shovels in place of conventional moldboard plow bottoms on a moldboard plow frame. These attachments allow for multi-purpose use of moldboard plow frames which results in lower overall equipment costs. However, the use of such an attachment results in a different line of force than that encountered with the use of moldboard bottoms. Since the conventional moldboard plow frame is disposed at an angle to the direction of travel and offset to one side of the draft vehicle hitch, use of chisel shovel attachments with a moldboard plow frame can result in overcutting or undercutting which affects the functional performance of the entire unit. Overcutting is most likely in moldboard frames for smaller on-land machines where the line of force generated by the chisel shovel attachment tends to move the frame toward a position perpendicular to the direction of travel to increase the working width of the unit. Undercutting is most likely to occur in moldboard frames for larger in-furrow machines where the forces tend to move the frame toward a fore-and-aft orientation with respect to the direction of travel to decrease the working width of the unit.

Attempts to overcome the problems of overcutting and undercutting include the use of a pre-opening coulter positioned forward of the chisel shovels and locked against pivoting from a fore-and-aft orientation. This approach, however, has met with only limited success.

Those concerned with these and other problems recognize the need for an improved chisel plow.

DISCLOSURE OF THE INVENTION

The present invention provides a chisel plow including a landside attached rearwardly of the chisel shovels. The landside is disposed to extend generally fore-and-aft and is disposed laterally outward to one of the lateral edges of the chisel shovel. As the chisel plow travels forwardly through the soil, each chisel shovel forms a fore-and-aft furrow defined by opposing furrow walls cut by the lateral edges of the chisel shovel. The landside bears against one of the furrow walls to counteract forces which tend toward an overcutting or undercutting condition. Structure is provided to allow the selective mounting of the landside to be disposed laterally outward to either of the lateral edges of the chisel shovel to control overcutting or undercutting. This results in improved functional performance of the entire chisel plow implement by allowing it to maintain its proper width of cut.

An object of the present invention is the provision of an improved chisel plow.

2

Another object is to provide a chisel plow having a landside to counteract forces which tend to an overcutting or undercutting condition.

A further object of the invention is the provision of a chisel plow having a landside which can be selectively mounted to extend laterally outward to either side of the chisel shovel to control either an overcutting or undercutting tendency.

Still another object is to provide a chisel plow including a landside attachment that can be easily and quickly mounted on a conventional moldboard plow frame.

A still further object of the present invention is the provision of a chisel plow having a landside attachment that is convenient to use and maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
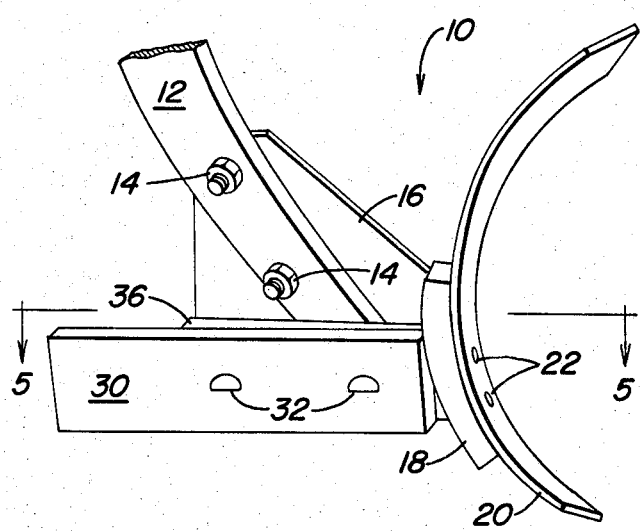
FIG. 1 is a perspective view showing a chisel shovel attachment mounted on a convention standard of a moldboard plow frame, wherein a landside is mounted to extend laterally outward to the right-hand lateral edge of the chisel shovel.
Figure 2:
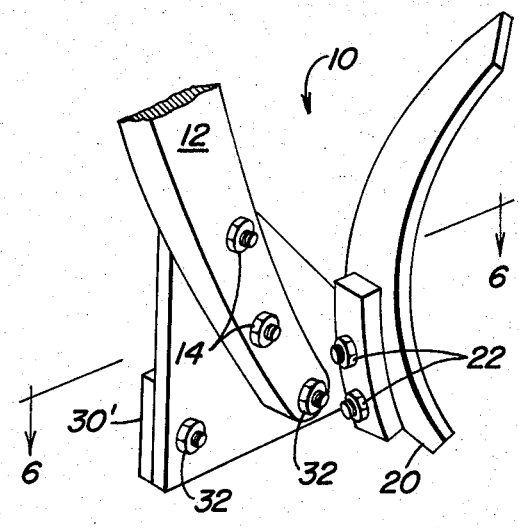
FIG. 2 is a perspective view similar to FIG. 1, but wherein a landside is mounted to extend laterally outward to the left-hand lateral edge of the chisel shovel.

Referring now to the drawings, wherein like reference numerals designate identical or corresponding parts throughout the several views, FIGS. 1 and 2 show a chisel plow attachment (10) mounted on a conventional moldboard plow frame standard (12) by bolts (14). The chisel plow attachment (10) includes a beam plate (16), a frog (18) attached to the forward end of the beam plate (16), and a chisel shovel (20) attached to the frog (18) by plow bolts (22). The chisel shovel (20) may be of various designs including that of the concave twisted shovel disclosed in U.S. Pat. No. 4,275,792.

Figure 3:
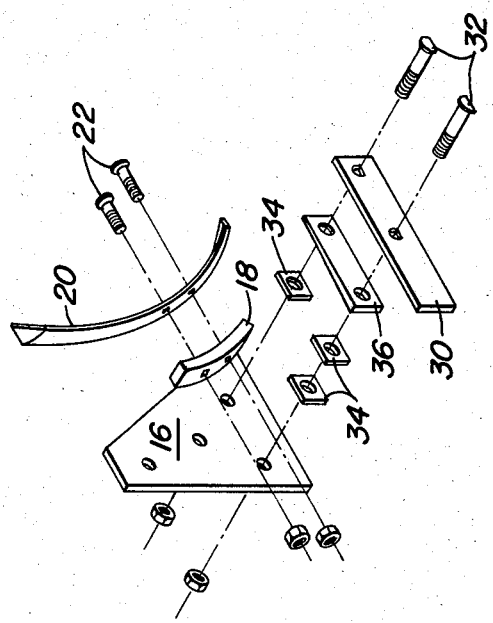
FIG. 3 is an exploded perspective view illustrating the orientation of the structural elements composing the chisel shovel attachment shown in FIG. 1.
Figure 5:
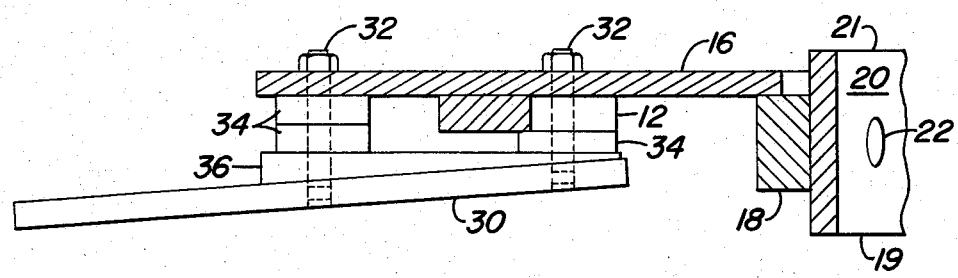
FIG. 5 is an enlarged sectional view taken along line 5—5 of FIG. 1, showing the landside disposed at an angle with respect to the direction of travel of the chisel shovel.

As best shown in FIGS. 1, 3 and 5, a landside (30) is releasably attached to the right-hand side of the standard (12) and to the rearward portion of beam plate (16) by plow bolts (32). Spacers (34) and a wedge plate (36) are placed intermediate the beam plate (16) and the landside (30) to dispose the landside (30) in an angular relationship with respect to the direction of travel of the chisel shovel (20), and to dispose the rearward portion of the landside (30) laterally outward to the right-hand lateral edge (19) of the chisel shovel (20). It is to be understood that the fore-and-aft disposed landside (30) could be disposed parallel to the direction of travel or be of any appropriate length, so long as the thickness of the spacers (34) and the relative thicknesses of the narrow and wide end of the wedge plate (36) act to laterally space a portion of the landside (30) to the lateral edge (19).

Figure 4:
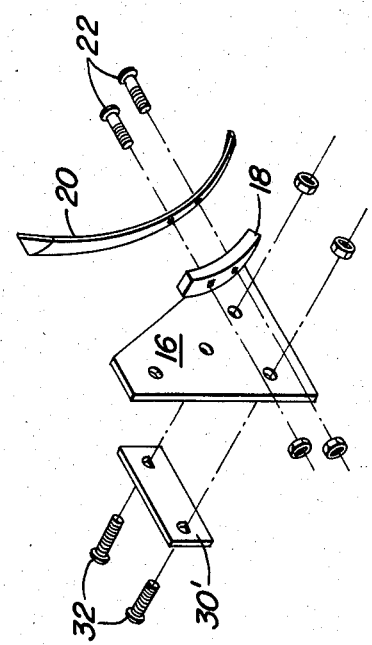
FIG. 4 is an exploded perspective view illustrating the orientation of the structural elements comprising the chisel shovel attachment shown in FIG. 2.
Figure 6:
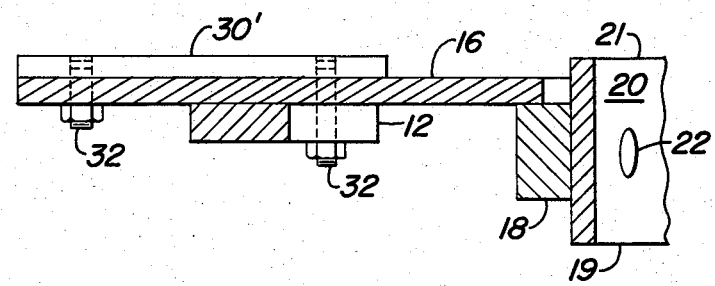
FIG. 6 is an enlarged sectional view taken along line 6—6 of FIG. 2, showing the landside disposed parallel to the direction of travel of the chisel shovel.
Figure 8:
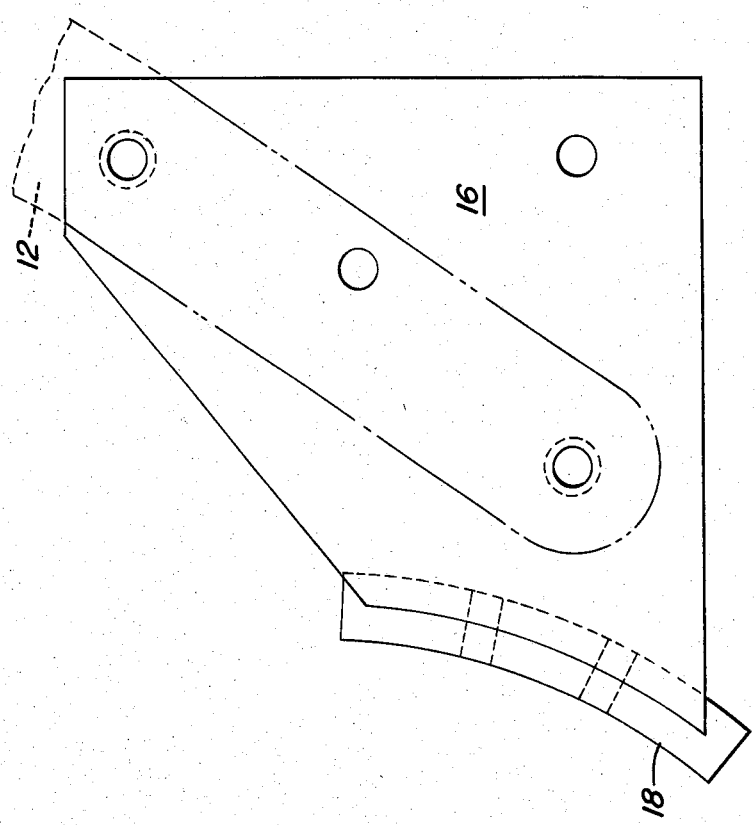
FIG. 8 is an enlarged side elevational view of the beam plate and frog, showing the position of the standard in dashed lines.
Figure 7:
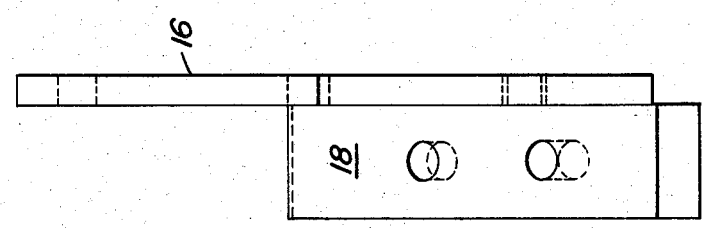
FIG. 7 is an enlarged front elevational view of the beam plate and frog that interconnects the standard and the chisel shovel.

FIGS. 2, 4 and 6 show a landside (30') releasably attached to the left-hand side of the standard (12) and to the rearward portion of beam plate (16) by plow bolts (32). The landside (30') extends fore-and-aft rearward of the chisel shovel (20) and is disposed laterally outward to the left-hand lateral edge (21) of the chisel shovel (20). It is to be understood that the landside (30') could be of any appropriate length and could have dimensions identical to landside (30).

In a situation where the line of force in a chisel plow implement causes a tendency toward undercutting or overcutting, the landside (30) or (30') is attached to be disposed laterally outward to the appropriate lateral edge (19) or (21) of the chisel shovel (20).

As for example, if an overcutting tendency exists, the landside (30') is attached to the left-hand side of the standard (12) as shown in FIGS. 2, 4 and 6. As the chisel shovel (20) travels forwardly through the soil, it forms a fore-and-aft furrow defined by opposing furrow walls cut by its lateral edges (19) and (21). A portion of the landside (30') bears against the furrow wall formed by the lateral edge (21) to counteract to forces tending to create the overcutting problem.

If an undercutting tendency exists, the landside (30') is removed from the left-hand side of the standard (12) and the landside (30) is attached to the right-hand side thereof and positioned by appropriate use of spacers (34) and a wedge plate (36). As indicated by reference to FIGS. 1, 3 and 5, the rear portion of the landside (30) will bear against the furrow wall formed by the lateral edge (19) to counteract the forces which cause undercutting.

Thus, it can be seen that at least all of the stated objectives have been achieved.

Obviously many modifications and variations of the present invention are possible in light of the above teachings. It is therefore to be understood that, within the scope of the appended claims, the invention may be practiced otherwise than as specifically described.

We claim:

1. In a chisel plow including a frame, a downwardly depending standard attached to the frame, and a chisel shovel attached to the standard and having lateral edges disposed to form a fore-and-aft furrow as the chisel shovel is moved forwardly through the soil, the improvement comprising:

a landside attached to said standard rearward of said shovel and disposed to extend generally fore-and-aft and disposed laterally outward to one of the lateral edges of said chisel shovel;

a beam plate including a frog attached to its forward end to receive said chisel shovel, said beam plate being attached to said standard and disposed to interconnect said standard and said chisel shovel; wherein said beam plate extends rearwardly from said standard, wherein said landside is attached to a rearward portion of said beam plate, and wherein said standard is disposed intermediate said beam plate and said landside;

a spacer attached to and disposed intermediate the rearward portion of said beam plate and said landside; and a wedge plate having a narrow end attached to and disposed intermediate said standard and said landside, and a wide end attached to and disposed intermediate said spacer and said landside.

2. The chisel plow of claim 1 wherein said landside is disposed in an angular relationship with respect to the direction of travel of said chisel plow.

* * * * *